(12) United States Patent
Muroi

(10) Patent No.: US 10,158,103 B2
(45) Date of Patent: Dec. 18, 2018

(54) RESIN FILM, METAL TERMINAL MEMBER, AND SECONDARY CELL

(71) Applicant: Toppan Printing Co., Ltd., Tokyo (JP)

(72) Inventor: Yuki Muroi, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 345 days.

(21) Appl. No.: 14/966,813

(22) Filed: Dec. 11, 2015

(65) Prior Publication Data

US 2016/0099446 A1 Apr. 7, 2016

Related U.S. Application Data

(63) Continuation of application No. PCT/JP2014/065726, filed on Jun. 13, 2014.

(30) Foreign Application Priority Data

Jun. 14, 2013 (JP) .................................. 2013-125846

(51) Int. Cl.
| | |
|---|---|
| *H01M 2/06* | (2006.01) |
| *H01M 2/08* | (2006.01) |
| *H01M 2/30* | (2006.01) |
| *H01M 10/0525* | (2010.01) |
| *H01M 10/0585* | (2010.01) |

(52) U.S. Cl.
CPC ............. *H01M 2/06* (2013.01); *H01M 2/08* (2013.01); *H01M 2/30* (2013.01); *H01M 10/0525* (2013.01); *H01M 10/0585* (2013.01); *H01M 2220/30* (2013.01)

(58) Field of Classification Search
CPC .............. H01M 2/06; H01M 10/0525; H01M 10/0585; H01M 2/30; H01M 2/08; H01M 2220/30

See application file for complete search history.

(56) References Cited

U.S. PATENT DOCUMENTS

2012/0082888 A1* 4/2012 Hashimoto ............ H01G 9/016
429/179

FOREIGN PATENT DOCUMENTS

| JP | 2002-245988 A | 8/2002 |
|---|---|---|
| JP | 2002-302659 A | 10/2002 |
| JP | 2003-007268 A | 1/2003 |
| JP | 2008-192451 A | 8/2008 |
| JP | 2009-143998 A | 7/2009 |

(Continued)

OTHER PUBLICATIONS

Machine translation of JP 2002-245988, retrieved from <https://www.j-platpat.inpit.go.jp/web/all/top/BTmTopEnglishPage> on Apr. 19, 2018.*

(Continued)

*Primary Examiner* — Cynthia K Walls
(74) *Attorney, Agent, or Firm* — Foley & Lardner LLP

(57) ABSTRACT

A resin film, which is adapted for use in a packaging material for secondary cell having a sealant layer formed of a polyolefin resin and is disposed between the sealant layer and leads, respectively, connected to a positive electrode and a negative electrode, includes a first layer at a position close to the leads and a second layer disposed at a position close to the sealant layer, a heat quantity of the second layer, measured according to JIS K 7122, being larger than a heat quantity of fusion of the first layer.

9 Claims, 1 Drawing Sheet

(56) References Cited

FOREIGN PATENT DOCUMENTS

| JP | 2010-165481 A | 7/2010 |
|---|---|---|
| JP | 4508199 B2 | 7/2010 |

OTHER PUBLICATIONS

International Search Report issued in PCT/JP2014/065726 dated Jul. 22, 2014.
Japanese Office Action dated Oct. 2, 2018 in corresponding application No. 2015-522878.

* cited by examiner

RESIN FILM, METAL TERMINAL MEMBER, AND SECONDARY CELL

CROSS-REFERENCE TO RELATED PATENT APPLICATIONS

This application is a continuation application filed under 35 U.S.C. 111(a) claiming the benefit under 35 U.S.C. §§ 120 and 365(c) of PCT International Application No. PCT/JP2014/065726 filed on Jun. 13, 2014, which is based upon and claims the benefit of priority of Japanese Application No. 2013-125846, filed on Jun. 14, 2013, the entire contents of them all are hereby incorporated by reference.

TECHNICAL FIELD

The present invention relates to a resin film, a metal terminal member and a secondary cell.

BACKGROUND

A trend toward the miniaturization such as of portable electronic devices, etc., has entailed most developments of lithium ion cells that are high in energy density and are capable of being miniaturized.

For the outer sheathing material of lithium ion cells, metal cans have hitherto been in frequent use. In recent years, multilayer films, which are lighter in weight and excellent in heat dissipation, have been employed.

For an electrolytic solution of lithium ion cell, there is used an aprotic solvent such as ethylene carbonate, propylene carbonate, dimethyl carbonate, diethyl carbonate, ethyl methyl carbonate or the like, and an electrolyte such as a lithium salt including $LiPF_6$, $LiBF_4$ or the like. These lithium salts react with water to form hydrofluoric acid, thereby causing the electrolytic solution to be degraded and cell members to be corroded. To cope with this, the outer sheathing material made of a multilayer film is usually provided with an aluminum foil layer in the inside thereof. For instance, there is known an outer sheathing material of the type, which has a base material layer/adhesive layer/aluminum foil layer/corrosion inhibition treatment layer/adhesive resin layer/sealant layer laminated successively.

In order to supply electric power from a lithium ion cell making use of the outer sheathing material formed of such a multilayer film, metal terminals called tabs, which are connected to positive and negative electrodes, respectively, are necessary. The tab is made of a metal terminal (lead) and a metal terminal covering resin film (tab sealant), and it is usual that aluminum is used for a lead (connected to a positive electrode) at a positive electrode side and nickel or copper is used for a lead (connected to a negative electrode) at a negative electrode side. The tab sealant is a member interposed between the lead and the outer sheathing material and should have the following properties.

For one of the properties required for the tab sealant, mention is made that it has adhesion to both the lead and the outer sheathing material. The adhesion between the lead and the outer sheathing material can be secured by use of a thermal fusible resin. The adhesion between the tab sealant and the lead can be improved by acid modification of a polyolefin resin used for the tab sealant layer.

Further, in the case where the tab sealant is fusion-bonded to the lead, a lead end portion has to be filled with the tab sealant without space therebetween. If the filling of the lead end portion with the tab sealant is insufficient, a space is formed between the tab sealant and the lead, thereby causing a content to be leaked out or the tab sealant and the lead to be separated from each other.

For the second property required for the tab sealant, mention is made that insulation between the lead and other member is secured. Upon thermal fusion bonding between the tab sealant and the lead, there is the possibility that although depending on the pressure and temperature conditions, the thickness of the tab sealant fusion-bonded to the lead becomes so small as not to secure the insulation. Especially, the thickness of the tab sealant fusion-bonded at the shoulder (or angled potion) of the lead is apt to be smallest. To avoid this, it is necessary to make the resin harder to flow by lowering its melt flow rate or to make use of a high melting resin so as to render it difficult to melt part of the tab sealant.

For example, in Patent Literature 1, acid-modified polypropylene is used as a tab sealant to improve adhesion between the tab sealant and a lead, and a tab sealant is formed as a three-layer structure wherein an intermediate layer of the tab layer is made higher in melting point than the other layers so as to keep the film thickness, thereby securing insulation.

CITATION LIST

Patent Literature

Patent Literature 1: Japanese Patent Publication No. 4508199

SUMMARY OF THE INVENTION

Technical Problem

In Patent Literature 1, however, although the melting points of the respective layers of the tab sealant are defined, respectively, no definition of the heat of fusion is made. Accordingly, with the technology set out in Patent Literature 1, if the melting points of the respective layers are close to each other, there would be some concern that a layer different from an intended layer is melted when the tab sealant is thermally fusion-bonded. Especially, with the case of the thermal fusion-bonding between the tab sealant and the lead in the making process of tab, the tab sealant and the lead should be fusion-bonded by melting only a portion of the tab sealant in contact with the lead without melting a portion of the tab in contact with a sealant of a packaging material while keeping the shape of the tab sealant. In this sense, the heating temperature has to be lowered or a heating time has to be prolonged depending on the respective heat quantities of fusion at a portion of the tab contacting the sealant of the packaging material and at a portion of the tab sealant contacting the lead, thereby leading to poor productivity.

The present invention has been made under such circumstances as stated above and has for an object the provision of a resin film for secondary cell, which is high in productivity and has good adhesion to a lead or an outer sheathing material and also has good filling and insulating properties.

Solution to Problem

A resin film according to one representative embodiment of the invention is of the type adapted for use in a packaging material for secondary cell having a sealant layer formed of a polyolefin resin wherein the resin film is disposed between the sealant layer and leads, respectively, connected to a positive electrode and a negative electrode inside the cell, and has a first layer disposed at a position close to the leads and a second layer disposed at a position close to the sealant layer, a heat quantity of fusion of the second layer, measured according to Japan Industrial Standard JIS K 7122, being not less than a heat quantity of fusion of the first layer, measured according to JIS K 7122. JIS K 7122 is hereby incorporated by reference in its entirety.

A resin film according to a second embodiment of the invention is of the type adapted for use in a packaging material for secondary cell having a sealant layer formed of a polyolefin resin wherein the resin film is disposed between the sealant layer and leads, respectively, connected to a positive electrode and a negative electrode inside the cell, and has a first layer disposed at a position close to the leads, a second layer disposed at a position close to the sealant layer, and an intermediate layer disposed between the first and second layers, a heat quantity of fusion of the second layer, measured according to JIS K 7122, being not less than a heat quantity of fusion of the first layer, measured according to JIS K 7122, a heat quantity of the intermediate layer, measured according to JIS K 7122, being not less than the heat quantity of fusion of the second layer, measured according to JIS K 7122.

The intermediate layer can have at least one layer whose heat quantity of fusion, measured according to JIS K 7122, is not less than 45 mJ/mg.

The heat quantity of fusion of the first layer, measured according to JIS K 7122, can be from not less than 15 mJ/mg to not larger than 65 mJ/mg.

The heat quantity of fusion of the second layer, measured according to JIS K 7122, can be from not less than 25 mJ/mg to not larger than 80 mJ/mg.

The heat quantity of fusion of the second layer, measured according to JIS K 7122, can be less than a heat quantity of the sealant layer, measured according to JIS K 7122.

The intermediate layer can be made of a laminate having a plurality of sub-layers wherein a heat quantity of fusion, measured according to JIS K 7122, of a sub-layer whose heat quantity of fusion is the smallest among those of the plurality of sub-layers of the intermediate layer, is larger than the heat quantity of fusion of the sealant layer, measured according to JIS K 7122.

The melting point of the intermediate layer and the melting point of the second layer can satisfy the following conditions: (melting point of the second layer+15° C.)<(melting point of the intermediate layer)<(melting point of the second layer+25° C.).

The melting point of the first layer and the melting point of the second layer can satisfy the following conditions: (melting point of the first layer)<(melting point of the second layer)<(melting point of the first layer+10° C.).

The melting point of the intermediate layer and the melting point of the sealant layer of the packaging material can satisfy the following conditions: (melting point of the sealant layer of the packaging material+5° C.)<melting point of the intermediate layer)<(melting point of the sealant layer of the packaging material+20° C.).

The melting point of the sealant layer of the packaging material and the melting point of the second layer can satisfy the following conditions: (melting point of the second layer)<(melting point of the sealant layer of the packaging material)<(melting point of the second layer+15° C.).

A metal terminal member for secondary cell according to a third embodiment of the invention should be provided with the resin film of the first or second embodiment.

A secondary cell according to a fourth embodiment of the invention should be provided with the resin film according to the first or second embodiment.

Effect of the Invention

The resin film, metal terminal member and secondary cell of the invention ensure improved or even high productivity and have good adhesion to a lead or an outer sheathing material, and good filling performance at a lead end portion and insulating properties.

DESCRIPTION OF REPRESENTATIVE EMBODIMENTS

The embodiments of the resin film of the invention are now described.

[First Embodiment]

Figure 1:
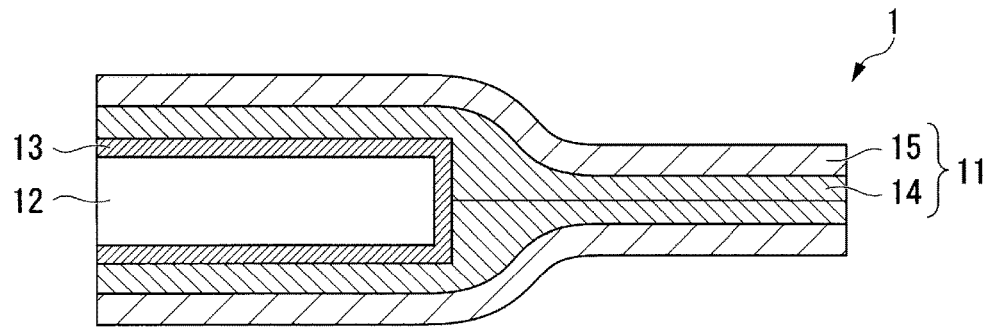
FIG. 1 is a schematic sectional view of a resin film according to a first embodiment of the invention.
Figure 2:
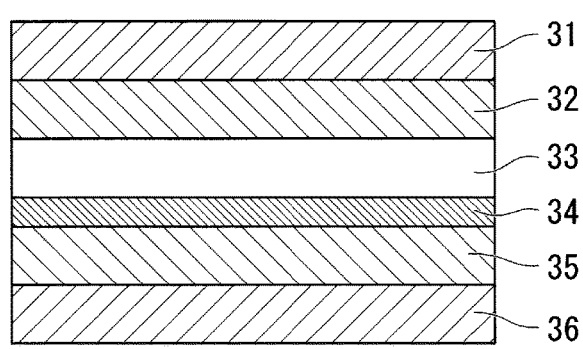
FIG. 2 is a schematic sectional view showing a configuration of a packaging material bonded to the resin film according to the embodiment of the invention.

FIG. 1 is a schematic sectional view of a resin film according to the present embodiment. FIG. 2 is a schematic sectional view showing a configuration of a packaging material to be bonded to the resin film of the embodiment.

A metal terminal member 1 (hereinafter referred to as "tab 1") of the embodiment has a resin film 11 made of a two-layer laminate (hereinafter referred to as "tab sealant 11"), and a metal terminal 12 (hereinafter referred to as "lead 12").

As shown in FIG. 1, the tab sealant 11 and the lead 12 are bonded through a corrosion inhibition treatment layer 13.

The tab 1 according to this embodiment is bonded to a packaging material 3 for secondary cell (hereinafter referred to simply as "packaging material 3"). The packaging material 3 is made of a laminate having a base material layer 31, an adhesive layer 32, a metal foil layer 33, a corrosion inhibition treatment layer 34, an adhesive resin layer 35 and a sealant layer 36 laminated successively as shown in FIG. 2.

(Tab Sealant 11)

The sealant 11 is made of a two-layer laminate formed of an innermost layer (first layer) 14 and an outermost layer (second layer) 15 as viewed from a position close to the lead 12.

(Innermost Layer 14)

The innermost layer 13 is one for bonding the lead 12, formed with the corrosion inhibition treatment layer 13 thereon, with the tab sealant 11. More particularly, the innermost layer 14 has adhesion to those resins of the lead 12 and the tab sealant 11, respectively. For the constituent component of the innermost layer 14, mention is made of polyolefin resins and acid-modified polyolefins wherein polyolefin resins are modified with an acid.

Of these, because adhesion between the tab sealant 11 and the lead 12 is improved, the acid-modified polyolefin resin is preferred as a constituent component of the innermost layer 14.

Examples of the polyolefin resin include: low-density, medium-density and high-density polyethylenes; ethylene- α-olefin copolymers, homo, block and random polypropylenes, propylene-α-olefin copolymers; and acid-modified products thereof.

The acid-modified polyolefins include, for example, those compounds obtained by modifying polyolefins with unsaturated carboxylic acids, and their acid anhydrides, and derivatives thereof. Examples of the unsaturated carboxylic acid and its acid anhydride, and a derivative thereof include acrylic acid, methacrylic acid, maleic acid, fumaric acid, crotonic acid, itaconic acid, and acid anhydrides, mono- and diesters, amides and imides thereof. Of these, acrylic acid, methacrylic acid, maleic acid and maleic anhydride are preferred, of which maleic anhydride is more preferred. The unsaturated carboxylic acid or its acid anhydride, or a derivative thereof should be properly copolymerized with polyolefins. The mode of copolymerization may include block copolymerization, random copolymerization, graft copolymerization or the like. These unsaturated carboxylic acids and their acid anhydrides, and derivatives thereof may be used singly or in combination of two or more.

The thickness of the innermost layer 14 is preferably from not less than 10 μm to not larger than 300 μm, more preferably from not less than 20 μm to not larger than 250 μm.

If the thickness of the innermost layer is not less than 10 μm, resin filling at the lead end portion with the tab sealant becomes satisfactory upon thermal fusion bonding between the tab sealant 11 and the lead 12. When the thickness of the innermost layer 14 is at not larger than 300 μm, an excess heat quantity is not needed during the thermal fusion bonding, thereby suppressing costs.

It will be noted that if the thickness of the innermost layer is less than 10 μm, resin filling at the lead end portion with the tab sealant becomes insufficient when the tab sealant 11 and the lead are thermally fusion-bonded. In the case where the thickness of the innermost layer 14 exceeds 300 mm, a larger heat quantity is needed when the tab is thermally fusion-bonded to a packaging material, thereby causing costs to be increased. Moreover, when taking resin filling of the tab sealant at the end portion of the lead 12 into account, it is preferred that the thickness of the innermost layer is set in conformity with a thickness of the lead 12.

The heat quantity of fusion of the innermost layer 14, measured according to JIS K 7122, is preferably at not less than 15 mJ/mg to not larger than 65 mJ/mg, more preferably at not less than 18 mJ/mg to not larger than 55 mJ/mg.

If the heat quantity of fusion of the innermost layer 14 is not less than 15 mJ/mg, under which the tab sealant 11 is thermally fusion-bonded to the lead 12 or the packaging material 3, the resin of the innermost layer 14 is less likely to be melted and is not allowed to flow excessively, so that the thickness of the tab sealant can be secured. If the heat quantity of fusion is not larger than 65 mJ/mg, resin melting necessary for the thermal fusion bonding between the tab sealant 11 and the lead 12 occurs and thus, adequate adhesion between the tab sealant 11 and the lead 12 is obtained. Additionally, satisfactory filling at the end portion of the lead 12 with the tab sealant 11 can be obtained.

It will be noted that if the heat quantity of fusion of the innermost layer 14 is less than 15 mJ/mg, the resin of the innermost layer 14 is liable to be melted when the tab sealant 11 is thermally fusion-bonded to the lead 12 or the packaging material 3, with concern that the film thickness may not be secured because of excess flow of the molten resin. In the case where the heat quantity of the innermost layer 14 exceeds 65 mJ/mg, the resin of the innermost layer 14 is not melted upon the thermal fusion bonding between the tab sealant 11 and the lead 12. Thus, adequate adhesion between the tab sealant 11 and the lead 12 cannot be obtained. In addition, satisfactory filling at the end portion of the lead 12 with the tab sealant 11 cannot be obtained.

The melting point of the innermost layer 14 is preferably within a range of from 130° C. to 145° C. If the melting point of the innermost layer 14 is at not lower than 130° C., a heat resistance is ensured upon fabrication and use of a cell. Moreover, in the case where the melting point of the innermost layer 14 is at not higher than 145° C., significant differences in melting point among the innermost layer 14, and the outermost layer 15 and an intermediate layer group 16 described hereinafter are obtained.

(Outermost Layer 15)

The outermost layer 15 is one for bonding between the tab sealant 11 and a sealant layer 36 of the packaging material 3. The constituent component of the outermost layer 15 should preferably be one which permits good bonding between the tab sealant 11 and the sealant layer 36. For instance, for the constituent component of the outermost layer 15, mention is made of polyolefin resins and acid-modified polyolefin resins wherein polyolefin resins are modified with acids.

The polyolefin resins and acid-modified polyolefin resins include those polyolefin resins and acid-modified polyolefin resins as exemplified with respect to the innermost layer 14. Proper selection of the component of the outermost layer in conformity with an adjacent layer in the tab sealant layer 11 and the constituent resin of the sealant layer 36 can lead to improvements in adhesion between the outermost layer 15 and the adjacent layer in the tab sealant layer 11 and also in adhesion between the outermost layer 15 and the sealant layer 36.

The thickness of the outermost layer 14 is preferably from not less than 10 μm to not larger than 300 μm, more preferably form not less than 20 μm to not larger than 250 μm.

If the thickness of the outermost layer 15 is not less than 10 μm, satisfactory filling of the resin at the lead end portion is obtained upon the thermal fusion bonding between the tab sealant 11 and the lead 12. Moreover, if the thickness of the outermost layer 15 is at not larger than 300 μm, a large heat quantity is not needed when the tab sealant 11 and the sealant layer 36 of the packaging material are thermally fusion-bonded, thereby leading to lowering costs.

It is to be noted that in the case where the thickness of the outermost layer 15 is less than 10 μm, resin filling at the lead end portion may become insufficient upon the thermal fusion bonding between the tab sealant 11 and the lead. In contrast, when the thickness of the outermost layer 15 exceeds 300 μm, a more heat quantity is necessary for the thermal fusion bonding between the tab sealant 11 and the sealant layer 36 of the packaging material, thereby possibly causing costs to be increased.

Preferably, the melting point of the outermost layer 15 is higher than the melting point of the innermost layer 14, and more preferably, a difference in melting point between the outermost layer 15 and the innermost layer 14 is at not less than 5° C. When the melting point of the outermost layer 15 is higher than the melting point of the innermost layer 14, under which the innermost layer 14 is thermally fusion-bonded to the lead 12, the outermost layer 15 is not melted and the resin does not eventually flow, so that it becomes easier to keep the shape of the tab sealant 11.

The tab sealant 11 should more preferably satisfy the conditions of (melting point of the innermost layer)<(melting point of the outermost layer)<(melting point of the innermost layer+10° C.), and should most preferably satisfy the conditions of (melting point of the innermost layer+5° C.)<(melting point of the outermost layer)<(melting point of the innermost layer+10° C.).

In the case where the tab sealant 11 satisfies the conditions of (melting point of the innermost layer)<(melting point of the outermost layer), the innermost layer 14 alone is melted and the outermost layer 15 is not melted at the time of thermal fusion bonding between the tab sealant 11 and the lead 12. In the case where the tab sealant 11 does not satisfy the conditions of the (melting point of the outermost layer) <(melting point of the innermost layer+10° C.) and the melting point of the outermost layer is higher than (melting point of the innermost layer+10° C.), heat sealing has to be carried out under higher conditions when the tab sealant 11 and the packaging material 3 are thermally fusion-bonded. Moreover, if the melting point of the outermost layer is higher than (melting point of the innermost layer+10° C.), a difference in melting point of the tab sealant 11 as a whole becomes so great that it becomes difficult to mold the tab sealant 11 (by extrusion molding, inflation molding, or the like).

The heat quantity of fusion of the outermost layer 15, measured according to JIS K 7122, is preferably at not less than 25 mJ/mg to not larger than 80 mJ/mg, more preferably at not less than 28 mJ/mg to not larger than 70 mJ/mg.

If the heat quantity of fusion of the outermost layer 15 is at not less than 25 mJ/mg, the resin of the outermost layer 15 is less likely to be melted and does not flow excessively when the tab sealant 11 is thermally fusion-bonded to the lead 12 and the packaging material 3, thereby securing the thickness of the tab sealant 11. If the heat quantity of fusion of the outermost layer 15 is not larger than 80 mJ/mg, resin melting of the outermost layer 15 necessary for the thermal fusion bonding between the tab sealant 11 and the packaging material 3 occurs, so that satisfactory adhesion between the tab sealant 11 and the packaging material 3 is secured.

It will be noted that where the heat quantity of fusion of the outermost layer 15 is less than 25 mJ/mg, the resin of the outermost layer 15 is liable to be melted and thus, the resin flows excessively upon the thermal fusion bonding between the tab sealant 11 and the lead 12 or the packaging material 3, with some concern that the thickness of the tab sealant 11 cannot be secured. In the case where the heat quantity of fusion of the outermost layer 15 exceeds 80 mJ/mg, the resin of the outermost layer 15 is not melted upon the thermal fusion bonding between the tab sealant 11 and the packaging material 3, with the possibility that good adhesion between the tab sealant 11 and the packaging material 3 cannot be obtained.

As compared with the heat quantity of fusion of the innermost layer 14, the heat quantity of fusion of the outermost layer 15 should preferably satisfy the conditions of (heat quantity of fusion of the outermost layer 15)>(heat quantity of fusion of the innermost layer 14). More preferably, a difference in the heat quantity of fusion between the outermost layer 15 and the innermost layer 14 is at not less than 10 mJ/mg.

Where the heat quantity of fusion of the outermost layer 15 exceeds the heat quantity of fusion of the innermost layer 14, the shape of the outermost layer 15 is kept without excessive flow of the outermost layer 15 at the time of the thermal fusion bonding between the tab sealant 11 and the lead 12 and thus, the thickness of the tab sealant 11 can be secured. In view of heat dissipation from the metal lead 12 brought into intimate contact with the innermost layer 14 as will be described hereinafter, the heat-quantity of fusion should preferably satisfy the above conditions.

It will be noted that in the case where the heat quantity of fusion of the outermost layer 15 is not larger than the heat quantity of fusion of the innermost layer 14, the outermost layer 15 can flow excessively at the time of the thermal fusion bonding between the tab sealant 11 and the lead 12, so that the shape of the outermost layer 15 cannot be kept, and the thickness of the tab sealant 11 possibly cannot be secured. In view of heat dissipation from the metal lead 12 brought into intimate contact with the innermost layer 14 as will be described hereinafter, the heat quantity of fusion should preferably satisfy the above conditions.

The melting point of the outermost layer is preferably within a range of not less than 130° C. to not larger than 155° C. When the melting point of the outermost layer is 130° C. or above, a heat resistance necessary for the fabrication and use of cell can be imparted. When the melting point of the outermost layer is at not larger than 155° C., an appreciable difference in melting point between the outermost layer and an intermediately layer appearing hereinafter is obtained.

(Lead 12)

The lead 12 is a terminal for taking electricity out of the inside of a secondary cell. The periphery of the lead 12 is in intimate contact with the tab sealant 11 so as to prevent a content of a secondary cell from being leaked. The material of the lead 12 is preferably accorded to the type of current collector of the secondary cell to be connected. For instance, with a lithium ion cell, aluminum is used as a current collector of a positive electrode, for which aluminum is preferably used as the lead 12 of the positive electrode. With a lithium ion cell, it is preferred from the standpoints of the use of copper for a current collector and a corrosion resistance to use a lead made of copper plated with nickel on the surface thereof, or nickel, for the lead 12 at the negative electrode side (or to be connected to the negative electrode).

In view of a resistance to corrosion of the lead 12 with an electrolytic solution, it is preferred to use aluminum, such as 1N30, having an aluminum purity of not less 97%, as the lead 12 at a positive electrode side (or to be connected to the positive electrode). The thermally fusion-bonded portion between the tab 1 and the packaging material 3 may be bent in some cases, for which it is more preferred to use type O-aluminum tempered by annealing for the purpose of imparting flexibility.

Although depending on the size and capacitance of a cell, the thickness of the lead 12 is at not less than 50 µm for small-sized cells used such as in portable electronic devices and is at not less than 100 µm to not larger than 500 µm for cells used for electric storage and vehicular applications. In order to reduce an electric resistance in the lead 12 in the cell, a thicker lead 12 may be used. Preferably, the thickness of the tab sealant 11 should be selected in conformity with the thickness of the lead 12.

(Corrosion Inhibition Treatment Layer 13)

The corrosion inhibition treatment layer 12 serves to prevent corrosion of the lead 12 with a corrosive component used in secondary cells. For example, with a lithium ion cell, a corrosion inhibition treatment layer 13 is able to inhibit the corrosion of the lead 12 with a lithium salt such as LiPF6, LiBF4 or the like and hydrofluoric acid formed by reaction between these lithium salts and water. The corrosion inhibition treatment layer 13 is preferably made of a coating film formed of an acid-resistant corrosion inhibitor treatment agent of a coating or immersion type. If the corrosion inhibition treatment layer 13 is formed of the coating film, an corrosion-inhibiting effect of the lead 12 against an acid is improved. The coating film can be formed, for example, by a ceriazole treatment with a corrosion inhibition treatment agent prepared from cerium oxide, a phosphate salt and a variety of thermosetting resins, or a chromate treatment with a corrosion inhibition treatment agent prepared from a chromate salt, a phosphate salt, a fluoride and a variety of thermosetting resins. The corrosion inhibition treatment layer 13 is not limited to those coating films formed by the above treatments so far as the coating film can impart an adequate corrosion resistance to the lead 12.

For instance, the corrosion inhibition treatment layer 13 may be formed by a phosphate treatment or a boehmite treatment.

(Fabrication Method of Tab 1)

A fabrication method of the tab 1 is now described. In this regard, however, the fabrication method of the tab 1 is not limited to the following procedure.

For the fabrication of the tab 1, mention is made, for example, of a method having the following steps (1-1) and (1-2).

(1-1) Step of molding a tab sealant 11
(1-2) Step of thermally fusion-bonding of the tab sealant 11 to a lead 12

Step (1-1)

A tab sealant 11 is made according to extrusion molding. The molding method includes T-die extrusion molding, inflation molding or the like, of which the inflation molding is preferred. The extrusion temperature of the tab sealant 11 is preferably from 180° C. to 300° C.

If the extrusion temperature of the tab sealant 11 is at not lower than 180° C., the resin used for the tab sealant 11 is well melted and can be stably extruded from the screw. If the extrusion temperature of the tab sealant 11 is at not higher than 300° C., considerable degradation of the tab sealant 11 owing to the oxidation of the resin used for the tab sealant 11 can be suppressed.

It will be noted that in the case where the extrusion temperature of the tab sealant 11 is lower than 180° C., insufficient melting of the resin used for the tab sealant 11 may result, so that extrusion of the resin for the tab sealant 11 from the screw becomes unstable. On the contrary, when the extrusion temperature of the tab sealant 11 is higher than 300° C., the resin used for the tab sealant 11 is oxidized and considerably degraded, thus leading to poorer quality.

Preferably, the revolutions of screw, blow ratio and take-up speed are appropriately selected depending on a preset film thickness. The ratio in thickness between the innermost layer 14 and the outermost layer 15 can be changed depending on the revolutions of screw.

(Step 1-2)

While the innermost layer 14 of the tab sealant 11 is melted by application of heat, the tab sealant 11 and the lead 12 are compressed thereby bringing the tab sealant 11 and the lead 12 into intimate contact with each other. For the thermal fusion-bonding of the tab sealant 11 and the lead 11, it is necessary that the innermost layer alone be melted so as to secure the film thickness of the tab sealant 11 and that the outermost layer be kept in the shape without being melted. If the heat quantity of fusion of the innermost layer 14 is less than the heat quantity of fusion of the outermost layer 15, there can be obtained adequate adhesion between the innermost layer 14 and the lead 12 while better keeping the shape of the outermost layer 15 by appropriate setting of the heating temperature and time of the tab sealant 11. A greater difference in the heat quantity of fusion between the innermost layer 14 and the outermost layer 15 leads to a higher heating temperature and a shorter heating time, so that productivity is improved.

(Packaging Material 3)

A packaging material according to the present embodiment is made of a laminate having a base material layer 31, an adhesive layer 32, a metal foil layer 33, a corrosion inhibition treatment layer 34, an adhesive resin layer 35, and a sealant layer laminated successively in this order.

The base material layer 31 serves to impart a heat resistance upon the thermal fusion bonding during the fabrication of secondary cell and also to inhibit occurrence of pinholes as would occur during the molding process and distribution of secondary cell. In view of improving piercing strength and impact strength, a biaxially stretched polyamide film or a biaxially stretched polyester film can be used as a material for the base material layer 31. Of these, the biaxially stretched polyamide film is preferred for the material of the base material layer from the standpoint of improving the moldability of the packaging material. The base material layer 31 may be in the form of a laminate. For instance, a biaxially stretched polyamide film and a biaxially stretched polyester may be laminated to provide a laminate configuration. Especially, when the biaxially stretched polyester film is provided as an outermost layer of the packaging material 3, the outermost layer becomes resistant to electrolytic solution.

The adhesive layer 32 is one, with which the base material layer 31 and the metal foil layer 33 are bonded to each other and which serves as an auxiliary role of protecting the metal foil layer 33 with the aid of the base material layer 31 in the course of the cold molding of the packaging material 3. The adhesives for the adhesive layer 32 include acrylic acid-based resin adhesives, epoxy resin adhesives, urethane resin adhesives, melamine resin adhesives, urea resin adhesives, polyimide resin adhesives and the like. Of these, urethane resin adhesives are preferred as a material of the adhesive layer 32. Preferred urethane resin adhesives include two-component curing adhesives, which are those resins formed by interacting a bi- or more-functional, aromatic or aliphatic isocyanate curing agent with a main agent such as a polyester polyol, a polyether polyol, an acrylic polyol or the like. The adhesives may be used singly or in combination of two or more.

For the metal foil layer 33, there can be used various types of metal foils such as of aluminum, stainless steel and the like. Especially, in view of moisture proofing, processability such as ductility and costs, an aluminum foil is preferred as the metal foil layer 33. Usable aluminum foils include an ordinary soft aluminum foil. In particular, it is preferred to use a layer using an iron-containing aluminum foil from the standpoints of a pinhole resistance and the capability of imparting ductility upon molding.

The corrosion inhibition treatment layer 34 acts to improve adhesion between the metal foil layer 33 and the adhesive resin layer 35 and also to suppress the corrosion of the metal foil layer 33 with hydrofluoric acid generated from an electrolytic solution or by reaction between an electrolytic solution and moisture. The corrosion inhibition treatment layer 34 is preferably made of a film formed of an acid-resistant, corrosion inhibition treatment agent of a coating or immersion type. If the corrosion inhibition treatment layer 34 is formed of such a coating film as mentioned above, an effect of inhibiting the corrosion of the metal foil layer 34 with an acid is improved.

The adhesive resin layer 35 is a layer for bonding the sealant layer 36 and the metal foil layer 33, on which the corrosion inhibition treatment layer 34 has been formed. The constituent resin of the adhesive resin layer 35 is preferably a thermoplastic resin. For instance, mention is made, as a material for the adhesive resin layer 35, of polyolefin resins, elastomer resins, and acid-modified polyolefin resins wherein polyolefin resins are modified with acids. Of these, acid-modified polyolefin resins having excellent adhesion to the metal foil layer 35 is preferred for use as a material of the adhesive resin layer 35. For the polyolefin resin, mention is made of polyolefin resins similar to those exemplified with respect to the innermost layer 14. Since the polyolefin resins and acid-modified polyolefin resins exhibit an excellent resistance to electrolytic solution, the lowering in adhesion between adjacent layers of the packaging material 3 due to the degradation of the adhesive resin is unlikely to occur even if hydrofluoric acid is generated.

The sealant layer 36 is an innermost layer of the packaging material 3, which is thermally fusion-bonded upon setting-up of a secondary cell. For the film component of the sealant layer 36, mention is made of polyolefin resins, and acid-modified polyolefin resins wherein polyolefin resins are modified with acids. Of these, polyolefin resins are preferred as a material of the sealant layer 36 in view of the fact that a cell configuration can be readily formed without being crushed excessively by heat sealing.

The polyolefin resins applicable to the sealant layer 36 include such polyolefin resins as exemplified with respect to the innermost layer 14. The sealant layer 36 may be formed of a film wherein the resins indicated above are blended. The sealant layer 36 may be made of a single-layer film or a multilayer film.

When compared with the heat quantity of fusion of the outermost layer 15, the heat quantity of fusion of the sealant layer 36, measured according to JIS K 7122, is preferably such that (heat quantity of fusion of the sealant layer 36)>(is greater than)(heat quantity of fusion of the outermost layer 15). When the heat quantity of fusion of the sealant layer 36 satisfies the above conditions, adequate adhesion between the outermost layer 15 and the sealant layer 36 can be obtained even when heat would be dissipated from the lead 12 made of a metal at the time of the thermal fusion bonding between the tab sealant 11 and the packaging material 3.

With respect to the relation between the melting point of the sealant layer of the packaging material and the melting point of the resin film used for the tab sealant, it is preferred to satisfy the conditions of (melting point of the outermost layer)<(melting point of the sealant layer of the packaging material)<(melting point of the outermost layer+15° C.).

With the case where the conditions of (melting point of the outermost layer)<(is less than)(melting point of the sealant layer of the packaging material) are satisfied, good adhesion between the tab and the packaging material is secured even when heat is dissipated from the lead (metal lead).

If the conditions of (melting point of the sealant layer of the packaging material)<(melting point of the outermost layer+15° C.) are not satisfied, there is some concern that the tab sealant is excessively melted upon thermal fusion bonding.

(Bonding Method between Tab 1 and Packaging Material 3)

The tab 1 and the packaging material 3 are bonded together by thermal fusion bonding. For the thermal fusion bonding between the tab 1 and the packaging material 3, a larger heat quantity is needed than with the case of mutual thermal fusion bonding of packaging materials 3. The heating temperature for bonding between the tab 1 and the packaging material 3 should be at a level not lower than the melting points of the outermost layer 15 and the sealant layer 36 so as to bring the tab 1 and the packaging material 3 into intimate contact with each other. In addition, in view of securing a film thickness of the tab sealant 11, the heating temperature and time should preferably be so controlled as not to allow excessive flow of the innermost layer 14 and the outermost layer 15.

According to the steps set out above, the tab 1 is obtained and the bonding between the tab 1 and the packaging material is carried out.

It will be noted that the fabrication method of the tab 1 and the bonding method between the tab 1 and the packaging material 3 are not limited to those methods wherein the above steps are carried out successively.

Next, another embodiment of a resin film according to the invention is described in detail.

[Second Embodiment]

Figure 3:
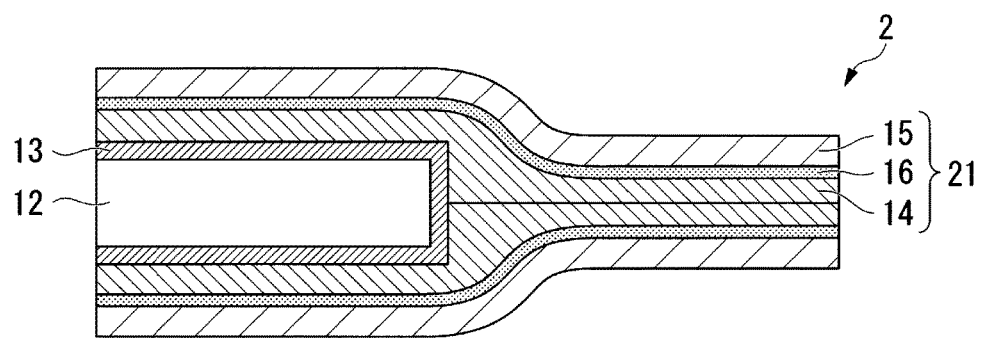
FIG. 3 is a schematic sectional view of a resin film according to a second embodiment of the invention.

FIG. 3 is a schematic sectional view of a resin film according to another representative embodiment.

As shown in FIG. 3, a resin film 31 of the embodiment (hereinafter referred to as "tab sealant 21") has a three-layer structure, which is a difference from the first embodiment. More particularly, the tab sealant 21 of the embodiment has an intermediate layer group 16 between the innermost layer 14 and the outermost layer 15.

(Innermost Layer 14)

The constituent component, thickness and melting point of the innermost layer 14 are same as those in the first embodiment and are preferably selected in similar ways as in the first embodiment, respectively.

(Outermost Layer 15)

The constituent component, thickness and melting point of the outermost layer 15 are same as those in the first embodiment and are preferably selected in similar ways as in the first embodiment, respectively.

The heat quantity of fusion of the outermost layer 15, measured according to JIS K 7122, is preferably from not less than 25 mJ/mg to not larger than 80 mJ/mg, more preferably from not less than 28 mJ/mg to not large than 70 mJ/mg.

If the heat quantity of fusion of the outermost layer 15 is at not less than 25 mJ/mg, a given film thickness of the tab sealant 21 is secured without excessive melting of the resin of the outermost layer 15 and also without excessive flow of the resin upon thermal fusion bonding between the tab sealant 21 and the lead 12 or the packaging material 3. If the heat quantity of fusion of the outermost layer 15 is at not larger than 80 mJ/mg, the resin of the outermost layer 15 is melted sufficiently for the thermal fusion bonding between the tab sealant 21 and the packaging material 3, so that adequate adhesion between the tab sealant 21 and the packaging material 3 is obtained.

It will be noted that in the case where the heat quantity of fusion of the outermost layer 15 is less than 25 mJ/mg, there is concern that the given film thickness cannot be secured since the resin of the outermost layer 15 is liable to be melted with attendant excessive flow of the resin when the tab sealant 21 and the lead 12 or packaging material 3 are thermally fusion-bonded. In contrast, where the heat quantity of fusion of the outermost layer 15 exceeds 80 mJ/mg, there is the possibility that the resin of the outermost layer 15 is not melted and thus, adequate adhesion between the tab sealant 21 and the packaging material 3 cannot be obtained upon thermal fusion bonding between the tab sealant 21 and the packaging material 3.

When compared with the heat quantity of fusion of the innermost layer 14, the heat quantity of fusion of the outermost layer 15 should preferably satisfy the following conditions of (heat quantity of fusion of the outermost layer 15)≥(heat quantity of fusion of the innermost layer 14) and more preferably satisfy the conditions of (heat quantity of fusion of the outermost layer 15)>(heat quantity of fusion of the innermost layer 14). Further, it is more preferred that a difference in heat quantity of fusion between the outermost layer 15 and the innermost layer 14 is at not less than 10 mJ/mg.

Where the heat quantity of fusion of the outermost layer 15 is at not less than the heat quantity of fusion of the innermost layer 14, the shape of the outermost layer 15 is kept without excessive flow of the outermost layer 15 upon thermal fusion bonding between the tab sealant 21 and the lead 12. Additionally, a given film thickness of the tab sealant 21 is secured.

It is to be noted that in the case where the heat quantity of fusion of the outermost layer 15 is less than the heat quantity of fusion of the innermost layer 14, the shape of the outermost layer 15 cannot be kept because of the excessive flow of the outermost layer 15 upon the thermal fusion bonding between the tab sealant 21 and the lead 12. Additionally, a given film thickness of the tab sealant 21 cannot be secured. A larger difference in the heat quantity of fusion between the outermost layer 15 and the innermost layer 14 leads to a less likelihood of melting the outermost layer 15 upon thermal fusion bonding between the tab sealant layer 21 and the lead 12, thus enabling the heating temperature of the tab sealant 21 and the lead 12 to be higher and the heating time of the tab sealant 21 and the lead 12 to be shorter. In view of the consideration of heat dissipation from the lead brought into intimate contact with the innermost layer 14, it is preferred that the heat quantities of fusion of the outermost layer 15 and the innermost layer 14 satisfy the above conditions.

When the component of the outermost layer 15 is made same as the component of the innermost layer 14, the film formation of the tab sealant 21 can be simplified. In this regard, however, the heat quantity of fusion of the innermost layer 14 and the outermost layer 15 are equal to each other, so that it is necessary that heating be carried out at a low heating temperature for a prolonged time so that the innermost layer alone is melted without causing the shape of the outermost layer 15 to be changed.

Like the first embodiment, the tab sealant 21 should preferably satisfy the conditions of (melting point of the innermost layer)<(melting point of the outermost layer)< (melting point of the innermost layer+10° C.), and more preferably satisfy the conditions of (melting point of the innermost layer+5° C.)<(melting point of the outermost layer)<(melting point of the innermost layer+10° C.

(Intermediate Layer Group 16)

The intermediate layer group 16 is one disposed between the innermost layer 14 and the outermost layer 15, and is formed of a single-layer or two- or more-layer laminate. For the constituent component of the intermediate layer group 16, mention is made of a polyolefin resin, or an acid-modified polyolefin resin wherein a polyolefin resin is modified with an acid in view of improving adhesion between the intermediate layer group 16 and the innermost layer 14 and the outermost layer 15. For the purpose of securing a given film thickness of the tab sealant 21 upon thermal fusion bonding of the tab sealant 21 to the lead 12, the intermediate layer group 16 may include a layer, such as of a polyester film, through an adhesive. For the polyolefin resin and acid-modified polyolefin resin, mention is made of polyolefin resins and acid-modified polyolefin resins as exemplified with respect to the innermost layer 14.

The thickness of the intermediate layer group is preferably at not less than 10 μm to not larger than 200 μm, more preferably at not less than 20 μm to not larger than 120 μm.

If the thickness of the intermediate layer group 16 is at not less than 10 μm, the insulating properties of the tab are secured, and if the thickness of the intermediate layer group 16 is at not large than 200 mm, costs can be suppressed.

It will be noted that where the thickness of the intermediate layer group 16 is less than 10 μm, the insulating properties of the tab may not be secured, and the thickness of the intermediate layer group 17 exceeding 200 μm causes costs to be increased.

The heat quantity of fusion of at least one layer of the intermediate layer group 16, measured according to JIS K 7122, is preferably at not less than 45 mJ/mg.

If all of the layers of the intermediate layer group 16 have a heat quantity of fusion of 45 mJ/mg, a given film thickness of the tab sealant 21 can be secured without excessive melting of the resin of the intermediate layer group and also without excessive flow of the resin upon thermal fusion bonding between the tab sealant 21 and the lead 12 or the packaging material 3.

It will be noted that if the heat quantities of fusion of all of the layers of the intermediate layer group 16 are less than 45 mJ/mg, there is some concern that a given film thickness of the tab sealant 21 cannot be secured because of the likelihood of melting the resin of the intermediate layer group and excessive flow of the resin upon thermal fusion bonding between the tab sealant 21 and the lead 12 or the packaging material 3. On the other hand, an upper limit of the heat quantity of fusion of the intermediate layer group is not particularly restricted and may be within a range not influencing other performances.

The heat quantity of fusion of at least one layer of the intermediate layer group, measured according to JIS K 7122, is preferably at not larger than 160 mJ/mg.

In the case where the heat quantities of fusion of all of the layers of the intermediate layer group 16 are larger than 160 mJ/mg, the heat quantity required for melting such resins upon molding becomes too large, thus being unsuited for the molding.

When comparing with the heat quantities of fusion of the outermost layer 15 and the sealant layer 36, the heat quantity of fusion of at least one layer of the intermediate layer group 16 should preferably satisfy the conditions of (heat quantity of fusion of the intermediate layer group 16)>(heat quantity of fusion of the outermost layer 15) and also the conditions of (heat quantity of fusion of the intermediate layer group 16)>(heat quantity of fusion of the sealant layer 36). It is more preferred that a difference in heat quantity of fusion between the at least one layer of the intermediately layer group 16 and the outermost layer 15 is at not less than 10 mJ/mg and that a difference in heat quantity of fusion between the at least one layer of the intermediately layer group 16 and the sealant layer 36 is at not less than 10 mJ/mg.

Where the heat quantities of fusion of all of the intermediate layer group 16 are at not larger than the heat quantities of fusion of the outermost layer 15 and the sealant layer 36, a given film thickness of the tab sealant 21 cannot be secured because of excessive flow of the intermediate layer group upon the thermal fusion bonding between the tab sealant 21 and the lead 12 or the packaging material 3. In addition, the insulating properties of the tab sealant 21 cannot be secured as well.

The tab sealant 21 should preferably satisfy the conditions of (melting point of the outermost layer+15° C.)<(melting point of the intermediate layer)<(melting point of the outermost layer+25° C.).

If the conditions of (melting point of the outermost layer+15° C.)<(melting point of the intermediate layer) are not satisfied, there is concern that the intermediate layer is melted upon the thermal fusion bonding, and insulation cannot be secured.

If the conditions of (melting point of the intermediate layer)<(melting point of the outermost layer+25° C.) are not satisfied, a difference in melting point of the tab sealant as a whole becomes large, making molding (extrusion molding or inflation molding) impossible.

The melting point of the intermediate layer group is preferably within a range of not less than 150° C. to not larger than 170° C. Where the melting point of the intermediate layer group 16 is at not less than 150° C., a given difference between the intermediate layer group 16 and the innermost and outermost layers 14, 15 is secured. Since a known critical melting point of polyolefin resin is approximately 170° C., it is preferred to set the melting point of the intermediate layer group at not larger than 170° C.

In a tab sealant having a three-layer configuration described hereinafter, it is preferred that in the relationship between the melting point of the sealant layer of a packaging material and the melting point of a resin film used for the tab sealant, the conditions of (melting point of the sealant layer of packaging material+5° C.)<(melting point of the intermediate layer)<(melting point of the sealant layer of packaging material+20° C.) are satisfied.

Where the conditions of (melting point of the sealant layer of packaging material+5° C.)<(melting point of the intermediate layer) are satisfied, insulation can be kept without melting of the intermediate layer upon the thermal fusion bonding between the tab and the packaging material.

If the conditions of (melting point of the intermediate layer)<(melting point of the sealant layer of packaging material+20° C.) are not satisfied, a difference in melting point of the tab sealant as a whole becomes large, making the molding (extrusion molding or inflation molding) impossible.

(Fabrication Method of Tab 2)

The fabrication method of the tab 2 is now described. In this regard, however, the fabrication of the tab 2 is not limited to the following procedure.

For the fabrication method of the tab 2, mention is made, for example, of a method having the following steps (2-1) and (2-2).

(2-1) Step of making a tab sealant 21.
(2-2) Step of thermally fusion-bonding the tab sealant 21 to a lead 12.

(Step 2-1)

Where the tab sealant 21 is formed of a resin comprising, as a major component, a polyolefin resin or an acid-modified polyolefin resin wherein a polyolefin resin is modified with an acid, the tab sealant 21 is made by extrusion. For the molding method, mention is made of extrusion molding using a T die and inflation molding, of which inflation molding is preferred.

The extrusion temperature for the tab sealant 21 is preferably from not lower than 180° C. to not higher than 300° C. In the case where the extrusion temperature of the tab sealant 21 is lower than 180° C., the melting of resin becomes insufficient, thus rending extrusion from the screw unstable. On the contrary, when the extrusion temperature for the tab sealant 21 is higher than 300° C., the resin of the tab sealant 21 is considerably degraded such as by oxidation and thus, the quality of the resulting tab sealant 21 becomes poor. It is preferred that the revolutions of screw, blow ratio and take-up speed are appropriately selected depending on the thickness set for the tab sealant 21. The ratio in thickness between the innermost layer 14 and the outermost layer 15 can be changed depending on the revolutions of screw.

Where a layer such as of a polyester film is included in the tab sealant 21 through an adhesive, the tab sealant 21 is formed by laminating a layer such as of a polyester film according to a dry lamination technique using an adhesive. For the formation of the tab sealant 21 by lamination of a layer such as of a polyester film, mention is made of dry lamination non-solvent lamination, wet lamination and the like method. In order to promote adhesion of the tab sealant 21, an aging treatment within a range of room temperature –100° C. may be performed on the tab sealant 21.

Step (2-2)

The innermost layer 14 is melted by heating the tab sealant 21, and the tab sealant 21 is compressed to bring the tab sealant 21 and the lead 12 into intimate contact with each other. For carrying out the thermal fusion bonding between the tab sealant 21 and the lead 12, it is necessary that the innermost layer 14 alone be melted so as to secure a given thickness of the tab sealant 21 and the shape of the outermost layer be kept without being melted. If the heat quantity of fusion of the innermost layer 14 is less than the heat quantity of fusion of the outermost layer 15, appropriate settings of the heating temperature and time for the tab sealant 21 permit adequate adhesion between the innermost layer 14 and the lead 12 while keeping the shape of the outermost layer 15.

A larger difference in the heat quantity of fusion between the innermost layer 14 and the outermost layer 15 enables a higher heating temperature and a shorter heating time for the tab sealant 21 to be used, thereby improving productivity of the tab 2.

(Bonding Method between Tab 2 and Packaging Material 3)

The tab 2 and the packaging material 3 are bonded together by thermal fusion bonding. For the thermal fusion bonding between the tab 2 and the packaging material 3, a more heat quantity is needed over the case of mutual thermal fusion bonding of the packaging materials. For the purpose of bringing the tab 2 and the packaging material 3 into intimate contact with each together, the tab 2 and the packaging material 3 should be heated to a temperature not lower than the melting points of the outermost layer 15 and the sealant layer 36. In view of securing a given thickness of the tab sealant 21, the heat temperature and time should preferably be so set as not to allow excessive flow of the resin of the tab sealant 21. With the case where the heat quantity of fusion of the intermediate layer group 16 is higher than the heat quantity of fusion of the outermost layer 15 and the heat quantity of fusion of the sealant layer 36, the tab 2 is heated under such conditions that the outermost layer 15 and the sealant layer 36 are melted and at least one layer of the intermediate layer group is not melted, with the result that adhesion between the tab 2 and the packaging material 3 can be ensured while securing a given thickness of the tab sealant 21.

According to the steps described above, the tab 2 can be obtained, and the tab 2 and the packaging material 3 can be bonded together.

It will be noted that the fabrication method of the tab 2 and the bonding method between the tab 2 and the packaging material 3 are not limited to those methods carrying out the above steps successively.

EXAMPLES

The present invention is described in detail by way of examples, which should not be construed as limiting the invention thereto.

[Materials Used]

The materials used in the examples are indicated below.

(Innermost Layer 14)

Innermost layer A-1: Maleic anhydride-modified polypropylene resin (with a thickness of 50 µm and a heat quantity of fusion of 10 mJ/mg)

Innermost layer A-2: Maleic anhydride-modified polypropylene resin (with a thickness of 50 µm and a heat quantity of fusion of 15 mJ/mg)

Innermost layer A-3: Maleic anhydride-modified polypropylene resin (with a thickness of 50 µm and a heat quantity of fusion of 30 mJ/mg)

Innermost layer A-4: Maleic anhydride-modified polypropylene resin (with a thickness of 50 µm and a heat quantity of fusion of 70 mJ/mg)

Innermost layer A-5: Maleic anhydride-modified polypropylene resin (with a thickness of 30 µm and a heat quantity of fusion of 10 mJ/mg)

Innermost layer A-6: Maleic anhydride-modified polypropylene resin (with a thickness of 30 µm and a heat quantity of fusion of 15 mJ/mg)

Innermost layer A-7: Maleic anhydride-modified polypropylene resin (with a thickness of 30 µm and a heat quantity of fusion of 30 mJ/mg)

Innermost layer A-8: Maleic anhydride-modified polypropylene resin (with a thickness of 30 µm and a heat quantity of fusion of 70 mJ/mg)

(Outermost Layer 15)

Outermost layer B-1: Polypropylene resin (with a thickness of 50 µm and a heat quantity of fusion of 20 mJ/mg)

Outermost layer B-2: Polypropylene resin (with a thickness of 50 µm and a heat quantity of fusion of 40 mJ/mg)

Outermost layer B-3: Polypropylene resin (with a thickness of 50 µm and a heat quantity of fusion of 75 mJ/mg)

Outermost layer B-4: Polypropylene resin (with a thickness of 50 µm and a heat quantity of fusion of 85 mJ/mg)

Outermost layer B-5: Polypropylene resin (with a thickness of 30 µm and a heat quantity of fusion of 20 mJ/mg)

Outermost layer B-6: Polypropylene resin (with a thickness of 30 µm and a heat quantity of fusion of 35 mJ/mg)

Outermost layer B-7: Polypropylene resin (with a thickness of 30 µm and a heat quantity of fusion of 40 mJ/mg)

Outermost layer B-8: Polypropylene resin (with a thickness of 30 µm and a heat quantity of fusion of 75 mJ/mg)

Outermost layer B-9: Polypropylene resin (with a thickness of 30 µm and a heat quantity of fusion of 85 mJ/mg)

(Intermediate Layer Group 16)

Intermediate layer group C-1: Polypropylene resin (with a thickness of 40 µm and a heat quantity of fusion of one layer of 40 mJ/mg)

Intermediate layer group C-2: Polypropylene resin (with a thickness of 40 µm and a heat quantity of fusion of one layer of 60 mJ/mg)

Intermediate layer group C-3: Polypropylene resin (with a thickness of 40 µm and a heat quantity of fusion of one layer of 95 mJ/mg)

(Lead 12)

Lead D-1: Aluminum terminal at a positive electrode side (with a thickness of 100 µm, a width of 5 mm and a length of 50 mm)

Lead D-2: Nickel terminal at a negative electrode side (with a thickness of 100 µm, a width of 5 mm and a length of 50 mm)

(Corrosion Inhibition Treatment Layer 13)

The corrosion inhibition treatment layer 13 is formed of such a treating agent for coating-type ceria sol treatment as indicated below.

Treating agent E-1: Treating agent E-1 is a coating-type agent for ceria sol treatment comprised mainly of cerium oxide, phosphoric acid, and an acrylic resin.

(Packaging Material 3)

Packaging material F-1: Packaging material F-1 is a made of a laminate having a base material layer 31 (25 µm thick polyamide film), an adhesive layer 32 (urethane resin adhesive), a metal foil layer 33 (40 µm thick aluminum foil), a corrosion inhibition treatment layer 34 (coating-type treating agent for ceria sol treatment), an adhesive resin layer 35 (20 µm thick maleic anhydride-modified polypropylene resin film) and a sealant layer 36 (40 µm thick polypropylene film with a heat quantity of fusion of 37 mJ/mg) laminated successively.

Packaging material F-2: Packaging material F-1 is a made of a laminate having a base material layer 31 (25 µm thick polyamide film), an adhesive layer 32 (urethane resin adhesive), a metal foil layer 33 (40 µm thick aluminum foil), a corrosion inhibition treatment layer 34 (coating-type treating agent for ceria sol treatment), an adhesive resin layer 35 (20 µm thick maleic anhydride-modified polypropylene resin film) and a sealant layer 36 (40 µm thick polypropylene film with a heat quantity of fusion of 45 mJ/mg) laminated successively.

Packaging material F-3: Packaging material F-1 is a made of a laminate having a base material layer 31 (25 µm thick polyamide film), an adhesive layer 32 (urethane resin adhesive), a metal foil layer 33 (40 µm thick aluminum foil), a corrosion inhibition treatment layer 34 (coating-type treating agent for ceria sol treatment), an adhesive resin layer 35 (20 µm thick maleic anhydride-modified polypropylene resin film) and a sealant layer 36 (40 µm thick polypropylene film with a heat quantity of fusion of 90 mJ/mg) laminated successively.

(Making of a Tab)

The treating agent E-1 was coated onto opposite surfaces of the lead D-1 and dried to provide a corrosion inhibition treatment layer 13. Next, the lead D-1 was sandwiched with a sealant from the opposite surfaces, followed by thermal fusion bonding under conditions of a fusion-bonding temperature of 150° C. and a fusion-bonding time of 10 seconds to provide a positive electrode tab. Likewise, a negative tab was made by use of the lead D-2 in a similar way as with the lead D-1.

[Making of Cell Samples for Evaluation]

The packaging material F-1 or F-2 was cut into a piece having a long side of 90 mm and a short side of 50 mm. The thus cut packaging piece was folded back so as to divide the long side into equal parts, and the positive tab and the negative tab, made by the above method, were both disposed between the 45 mm long sides of the folded-back packaging material. The positive electrode tab and the negative electrode tab were thermally fusion-bonded to the sides (45 mm long side) of the folded-back packaging material under conditions of a fusion-bonding temperature of 190° C. and a fusion-bonding time of 3 seconds thereby bonding the positive electrode tab and the negative electrode tab to the packaging material, respectively. Next, the 50 mm long sides of the packaging material, to which the positive electrode tab and the negative electrode tab had been, respectively, bonded, were each thermally fusion-bonded under conditions of a fusion-bonding temperature of 190° C. and a fusion-bonding time of 3 seconds to provide a tab-bearing packaging material having a pouch structure whose three sides were sealed. 2 ml of an electrolytic solution (i.e. a solution dissolving LiPF6¬ (lithium hexafluoride phosphate) in ethylene carbonate/dimethyl carbonate/diethyl carbonate=1/1/1 (ratios by mass) at a concentration of 1.5 mol/L) was added to the inside of the tab-bearing packaging material having the pouch structure. Thereafter, the remaining side of the tab-bearing packaging material having the pouch structure was thermally fusion-bonded under conditions of a fusion-bonding temperature of 190° C. and a fusion-bonding time of 3 seconds, thereby providing a cell sample for evaluation.
[Evaluation Method of the Shape of a Tab Sealant Upon Thermal Fusion Bonding]

The outermost layer of the tab sealant of each tab obtained in the respective examples was visually observed as to shape change as would result from thermal fusion bonding between the lead and the tab sealant.

The evaluation was made according to the following standards.

"O (excellent)": No shape change of the outermost layer due to the thermal fusion bonding was recognized.

"X (bad)": An appreciable shape change of the outermost layer due to the thermal fusion bonding was recognized.
(Evaluation of Adhesion Between Tab Sealant and Packaging Material)

In order to evaluate adhesion between a cell sample for evaluation and a tab obtained in each example. Peel strength between a tab sealant and a lead 12 was measured by means of a tensile tester.

The evaluation was made according to the following standards.

The peel strength used as evaluation reference was one obtained from the test results of adhesion in Example 1. In the following Table 1, symbol "-" at the column of adhesion of Example 1 indicates reference peel strength itself.

"O (excellent)": The lowering of peel strength was less than 10% when comparing with the reference peel strength. Or, peel strength was improved over the reference peel strength.

"Δ (good)": The lowering of peel strength was from not less than 10% to less than 20% when comparing with the reference peel strength.

"X (bad)": The lowering of peel strength was at not less than 20% when comparing with the reference peel strength.
[Evaluation of Insulation Between Leads and Packaging Material]

With respect to the positive electrode lead and the negative electrode lead of a cell sample for evaluation made in the respective examples, the presence or absence of short-circuiting with a metal foil layer of a packaging material was confirmed by use of a tester.

The evaluation was made according to the following standards.

"O (excellent)": Short-circuiting was found in 0 of 100 samples.

"Δ (good)":Short-circuiting was found in 1 to less than 5 of 100 samples.

"X (bad)": Short-circuiting was found in 5 or more of 100 samples.
[Evaluation of Filling Performance at a Lead Terminal End Portion]

The filling performance was evaluated by subjecting a tab made in each example to staining with a highly penetrative, staining solution (Microcheck, made by Taihokozai Co., Ltd.).

The evaluation was made according to the following standards.

"O (excellent)": Penetrative staining of the highly penetrative, staining solution at a lead terminal end portion was found in 0 of 50 samples.

"Δ (good)": Penetrative staining of the highly penetrative, staining solution at the lead terminal end portion was found in 1 to not less than 3 of 50 samples.

"X (bad)": Penetrative staining of the highly penetrative, staining solution at the lead terminal end portion was found in 3 or more of 50 samples.

Examples 1-5 and Comparative Examples 1-2

Tabs and cell samples for evaluation having such configurations as shown in Table 1 were made. The results of evaluations of shape, adhesion, insulation and filling performance are also shown in Table 1.

TABLE 1

| | Innermost layer | Outermost Sealant layer | Sealant layer | Heat quantity of fusion [mJ/mg] | | | Shape | Adhesion | Insulation | Filling performance |
|---|---|---|---|---|---|---|---|---|---|---|
| | | | | Innermost layer | Outermost layer | Sealant layer | | | | |
| Example 1 | A-3 | B-2 | F-2 | 30 | 40 | 45 | O | — | O | O |
| Example 2 | A-1 | B-2 | F-2 | 10 | 40 | 45 | O | O | Δ | O |
| Example 3 | A-4 | B-3 | F-3 | 70 | 75 | 90 | O | O | O | Δ |
| Example 4 | A-2 | B-1 | F-2 | 15 | 20 | 45 | O | O | Δ | O |
| Example 5 | A-3 | B-4 | F-3 | 30 | 85 | 90 | O | Δ | O | O |
| Comp. Ex. 1 | A-4 | B-2 | F-2 | 70 | 40 | 45 | X | O | X | X |
| Comp. Ex. 2 | A-3 | B-3 | F-2 | 30 | 75 | 45 | O | X | O | O |

As shown in Table 1, the results of evaluation revealed no problem with respect to all of the shape, adhesion, insulation and filling performance.

As to the adhesion between the tab sealant and the packaging material, the comparison between Example 1 and Example 5 wherein the heat quantity of fusion of the outermost layer is at 85 mJ/mg revealed that better results were obtained in Example 1 wherein the heat quantity of fusion of the outermost layer was at 40 mJ/mg.

With respect to the insulation, the comparison among Example 1, Example 2 wherein the heat quantity of fusion of the outermost layer was at 20 mJ/mg and Example 4 wherein the heat quantity of fusion of the outermost layer was at 40 mJ/mg revealed that more preferred results were obtained in Example 1 wherein the heat quantity of fusion of the innermost layer was at 30 mJ/mg and the heat quantity of fusion of the outermost layer was at 40 mJ/mg.

As to the filling performance, the comparison between Example 1 and Example 3 wherein the heat quantity of fusion of the outermost layer was at 70 mJ/mg revealed that better results were obtained in Example 1 wherein the heat quantity of fusion of the innermost layer was at 30 mJ/mg.

On the other hand, with Comparative Example 1 wherein the order of the heat quantity of fusion was such that (heat quantity of fusion of the innermost layer)>(heat quantity of fusion of the outermost layer), the shape of the outermost layer was deformed during the thermal fusion bonding upon making of the tab.

Further, with Comparative Example 2 wherein (heat quantity of fusion of the outermost layer)>(heat quantity of fusion of the sealant layer), the adhesion between the tab sealant and the packaging material was not satisfactory.

Examples 6-11 and Comparative Examples 3-5

Next, according to the fabrication method set out above, tabs and cell samples for evaluation, each having such a configuration as shown in Table 2, were made. The results of evaluations of the shape, adhesion, insulation and filling performance are also shown in Table 2.

It will be noted that as to the adhesion of the tabs and the cell samples for evaluation with configurations shown in Table 2, peel strength used as an evaluation reference (reference peel strength) was one obtained from the test results of the adhesion in Example 6. In Table 2 indicated below, the symbol "-" in the column of adhesion of Example 6 indicates reference peel strength itself.

fusion of the innermost layer was at 70 mJ/mg demonstrated that better results were obtained for Example 6 wherein the heat quantity of fusion of the innermost layer was at 30 mJ/mg.

On the other hand, with Comparative Example 3 wherein the order of the heat quantity of fusion was such that (heat quantity of fusion of the innermost layer)>(heat quantity of fusion of the outermost layer), the shape of the outermost layer was deformed during the thermal fusion bonding upon making of the tab.

With Comparative Example 4 wherein (heat quantity of fusion of the outermost layer)>(heat quantity of fusion of the sealant layer), the adhesion between the tab sealant and the packaging material was not adequate. With Comparative Example 5 wherein (heat quantity of fusion of the sealant layer)>(heat quantity of fusion of the intermediate layer group), the insulation was unsatisfactory.

Further, in the following examples and comparative examples, the materials of the cell samples for evaluation were replaced by those materials indicated below.

[Materials Used]

(Innermost Layer 14)

Innermost layer A-9: Maleic anhydride-modified polypropylene resin (with a thickness of 30 μm, a heat quantity of fusion of 19 mJ/mg, and a melting point of 137° C.)

Innermost layer A-10: Maleic anhydride-modified polypropylene resin (with a thickness of 30 μm, a heat quantity of fusion of 26 mJ/mg, and a melting point of 140° C.)

Innermost layer A-11: Maleic anhydride-modified polypropylene resin (with a thickness of 30 μm, a heat quantity of fusion of 30 mJ/mg, and a melting point of 143° C.)

TABLE 2

| | | | | | Heat quantity of fusion [mJ/mg] | | | | | | | |
|---|---|---|---|---|---|---|---|---|---|---|---|---|
| | Innermost layer | Outermost layer | Sealant layer | Intermediate layer group | Innermost layer | Outermost layer | Sealant layer | Intermediate layer group | Shape | Adhesion | Insulation | Packing performance |
| Example 6 | A-7 | B-7 | F-2 | C-2 | 30 | 40 | 45 | 60 | ○ | — | ○ | ○ |
| Example 7 | A-5 | B-7 | F-2 | C-2 | 10 | 40 | 45 | 60 | ○ | ○ | Δ | ○ |
| Example 8 | A-8 | B-8 | F-3 | C-3 | 70 | 75 | 90 | 95 | ○ | ○ | ○ | Δ |
| Example 9 | A-6 | B-5 | F-2 | C-2 | 15 | 20 | 45 | 60 | ○ | ○ | Δ | ○ |
| Example 10 | A-7 | B-9 | F-3 | C-3 | 30 | 85 | 90 | 95 | ○ | Δ | ○ | ○ |
| Example 11 | A-7 | B-6 | F-1 | C-1 | 30 | 35 | 37 | 40 | ○ | ○ | Δ | ○ |
| Comp. Ex. 3 | A-8 | B-7 | F-2 | C-2 | 70 | 40 | 45 | 60 | X | ○ | X | X |
| Comp. Ex. 4 | A-7 | B-8 | F-2 | C-2 | 30 | 75 | 45 | 60 | ○ | X | ○ | ○ |
| Comp. Ex. 5 | A-7 | B-7 | F-2 | C-1 | 30 | 40 | 45 | 40 | ○ | ○ | X | ○ |

As shown in Table 1, Example 6 has no problem with respect to the results of evaluation of the shape, adhesion, insulation and filling performance.

With respect to the adhesion between the tab sealant and the packaging material, the comparison between Example 6 and Example 10 wherein the heat quantity of fusion of the outermost layer was at 85 mJ/mg revealed that better results were obtained for Example 6 wherein the heat quantity of fusion of the outermost layer was at 40 mJ/mg.

As to the insulation, the comparison among Example 6, Example 7 wherein the heat quantity of fusion of the innermost layer was at 10 mJ/mg, Example 9 wherein the heat quantity of fusion of the outermost layer was at 20 mJ/mg and Example 11 wherein the heat quantity of fusion of the intermediate layer group was at 40 mJ/mg revealed that more preferred results were obtained for Example 6 wherein the heat quantity of fusion of the innermost layer was at 30 mJ/mg, the heat quantity of fusion of the outermost layer was at 40 mJ/mg, and the heat quantity of fusion of the intermediate layer group was at 60 mJ/mg As to the filling performance, the comparison between Example 6 and Example 8 wherein the heat quantity of fusion of the innermost layer was at 70 mJ/mg demonstrated that better results were obtained for Example 6 wherein the heat quantity of fusion of the innermost layer was at 30 mJ/mg.

Innermost layer A-12: Maleic anhydride-modified polypropylene resin (with a thickness of 30 μm, a heat quantity of fusion of 62 mJ/mg, and a melting point of 159° C.)

(Outermost Layer 15)

Outermost layer B-10: Polypropylene resin (with a thickness of 30 μm, a heat quantity of fusion of 26 mJ/mg, and a melting point of 140° C.)

Outermost layer B-11: Polypropylene resin (with a thickness of 30 μm, a heat quantity of fusion of 30 mJ/mg, and a melting point of 143° C.)

Outermost layer B-12: Polypropylene resin (with a thickness of 30 μm, a heat quantity of fusion of 62 mJ/mg, and a melting point of 159° C.)

Outermost layer B-13: Polypropylene resin (with a thickness of 30 μm, a heat quantity of fusion of 75 mJ/mg, and a melting point of 161° C.)

(Intermediate Layer Group)

Intermediate layer group C-4: Polypropylene resin (with a thickness of 40 μm, a heat quantity of fusion of one layer of 19 mJ/mg, and a melting point of 137° C.)

Intermediate layer group C-5: Polypropylene resin (with a thickness of 40 μm, a heat quantity of fusion of one layer of 62 mJ/mg, and a melting point of 159° C.)

Intermediate layer group C-4: Polypropylene resin (with a thickness of 40 μm, a heat quantity of fusion of one layer of 75 mJ/mg, and a melting point of 161° C.)

(Packaging Material 3)

Packaging material F-4: Packaging material F-4 is a laminate having a base material layer 31 (25 μm thick polyamide film), an adhesive layer 32 (urethane resin adhesive), a metal foil layer 33 (40 μm thick aluminum film), a corrosion inhibition treatment layer 34 (coating-type treating agent for ceria sol treatment), an adhesive resin layer 35 (20 mm thick maleic anhydride-modified polypropylene resin), and a sealant layer 36 (40 μm thick polypropylene film with a heat quantity of fusion of 45 mJ/mg and a melting point of 152° C.) laminated successively.

Packaging material F-5: Packaging material F-5 is a laminate having a base material layer 31 (25 μm thick polyamide film), an adhesive layer 32 (urethane resin adhesive), a metal foil layer 33 (40 μm thick aluminum film), a corrosion inhibition treatment layer 34 (coating-type treating agent for ceria sol treatment), an adhesive resin layer 35 (20 μm thick maleic anhydride-modified polypropylene resin), and a sealant layer 36 (40 μm thick polypropylene film with a heat quantity of fusion of 75 mJ/mg and a melting point of 161° C.) laminated successively.

It will be noted that with respect to the lead and the treating agent used to form the lead 12 and the corrosion inhibition treatment layer 13, the leads D-1 and D-2 used in Examples 1-11 and Comparative Examples 1-5 were used, respectively, and the treating agent E-1 was used. According to the method of "tab fabrication", a positive electrode tab and a negative electrode tab were made.

In the same manner as described in the forgoing "making of cell samples for evaluation", the tabs and cell samples for evaluation having such configurations as indicated in Tables 3-5 were made by use of such materials as indicated above, respectively.

Further, the "evaluation method of the shape of a tab sealant upon thermal fusion bonding" was changed to such an evaluation method as described below to evaluate the cell samples for evaluation.

[Evaluation Method of the Shape of a Tab Sealant Upon Thermal Fusion Bonding]

The outermost layer of a tab sealant of the tab obtained in each example was visually observed as to whether a shape change appeared during thermal fusion bonding between the lead and the tab sealant. The evaluation was made according to the following standards.

"O (excellent)": The shape change of the outermost layer upon thermal fusion bonding was found in 0 of 20 samples.

"Δ (good)": The shape change of the outermost layer upon thermal fusion bonding was found in 1 to less than 3 of 20 samples.

"X (bad)": The shape change of the outermost layer upon thermal fusion bonding was found in not less than 3 of 20 samples.

It is to be noted that in the following examples and comparative examples, the "evaluation of adhesion between tab sealant and packaging material", "evaluation of insulation between lead and packaging material", and "evaluation of packing performance at a lead terminal end portion" were made according to the same standards as with the evaluation methods set out before, respectively.

Examples 12-14 and Comparative Examples 6-9

The results of evaluations of the shape, adhesion, insulation and filling performance are also shown in Table 3.

In the column of adhesion between the tabs and the cell samples for evaluation shown in Table 3, the peel strength used as an evaluation reference (reference peel strength) was one obtained from the test results of the adhesion in Example 12. In Table 3 shown below, the symbol "-" in the column of adhesion of Example 12 indicates reference peel strength itself.

TABLE 3

|  | | | | Melting point [° C.] | | | Heat quantity of fusion [mJ/mg] | | | | | | Packing |
| --- | --- | --- | --- | --- | --- | --- | --- | --- | --- | --- | --- | --- | --- |
|  | Innermost layer | Outermost layer | Sealant layer | Innermost layer | Outermost layer | Sealant layer | Innermost layer | Outermost layer | Sealant layer | Shape | Adhesion | Insulation | performance |
| Example 12 | A-10 | B-11 | F-4 | 140 | 143 | 152 | 26 | 30 | 45 | O | — | O | O |
| Example 13 | A-12 | B-13 | F-4 | 159 | 161 | 152 | 62 | 75 | 45 | O | Δ | O | Δ |
| Example 14 | A-9 | B-10 | F-4 | 137 | 140 | 152 | 19 | 26 | 45 | Δ | O | Δ | O |
| Comp. Ex. 6 | A-11 | B-10 | F-4 | 143 | 140 | 152 | 30 | 26 | 45 | X | O | X | O |
| Comp. Ex. 7 | A-11 | B-11 | F-4 | 143 | 143 | 152 | 30 | 30 | 45 | X | O | X | O |
| Comp. Ex. 8 | A-12 | B-11 | F-4 | 159 | 143 | 152 | 62 | 30 | 45 | X | O | O | X |
| Comp. Ex. 9 | A-10 | B-12 | F-4 | 140 | 159 | 152 | 26 | 62 | 45 | O | X | O | O |

As shown in Table 3, excellent results were obtained in Example 12 with respect to the evaluation of any of the shape, adhesion, insulation and filling performance.

As to the adhesion of Example 13, since the melting point of the outermost layer was so high that adhesion between the tab and the sealant layer was difficult. However, a difference in heat quantity between the innermost layer and the outermost layer was not large, under which when the temperature of the thermal heat bonding was raised and the thermal fusion bonding time was prolonged, the adhesion between the tab and the sealant layer could be secured.

With respect to the filling performance of Example 13, the innermost layer was hardly melted and thus, the results were "good". In Example 13, since the outermost layer was more hardly melted, the filling performance could be improved by raising the thermal fusion bonding temperature and prolonging the thermal fusion bonding time.

As to the shape evaluation and insulation of Example 13, such good results as in Example 12 were obtained.

With respect to the shape evaluation of Example 14, since the outermost layer was more likely to be melted than in the case of Example 12, the results were "good".

As to the insulation of Example 14, since the outermost layer was more likely to be melted than in Example 12 like the shape evaluation, the outermost layer was prone to flow.

As to the adhesion and packing performance of Example 14, such excellent results as in Example 12 were obtained.

As to the shape evaluation of Comparative Example 6, since the melting point and the heat quantity of fusion of the outermost layer were lower than the melting point and the heat quantity of fusion of the innermost layer, respectively, the outermost layer was melted earlier than the innermost layer, thereby not securing the shape of the outermost layer of Comparative Example 6.

As to the insulation of Comparative Example 6, because the innermost layer and the outermost layer were both melted, the film thickness of the tab sealant could not be secured and thus, no insulation was obtained.

As to the shape evaluation and insulation of Comparative Example 7, excellent results were not obtained for such a reason as in Comparative Example 6.

In Comparative Example 7, resins having similar characteristics were used for the innermost and outermost layers, so that both of the innermost and outermost layers were melted.

With respect to the shape evaluation of Comparative Example 8, excellent results were not obtained for similar reasons as in Comparative Example 6.

As to the filling performance of Comparative Example 8, the innermost layer of Comparative Example 8 was hardly melted, the neighborhood of the lead could not be filled with the resin of the tab sealant.

It will be noted that although Example 13 made use of the same innermost layer as in Comparative Example 8, the outermost layer of Example 13 was more unlikely to be melted and thus, the thermal fusion molding temperature could be raised and the thermal fusion bonding time could be prolonged, so that the neighborhood of the lead could be filled with the resin of the tab sealant.

As to the adhesion of Comparative Example 9, the melting point of the outermost layer of Comparative Example 9 was so high that adequate adhesion between the tab and the sealant layer of the packaging material could not be secured. When the thermal fusion bonding temperature was raised and the thermal fusion bonding time was prolonged, the innermost layer was melted excessively, thereby lowering insulation.

It should be noted that in Example 13, a difference in melting point between the innermost layer and the outermost layer was smaller than in Comparative Example 9, under which when the thermal fusion bonding temperature was raised and the thermal fusion bonding time was prolonged, the innermost layer was not melted excessively.

From the above results, it was revealed that the resin film used as a tab sealant should preferably satisfy the conditions of (melting point of the innermost layer)<(melting point of the outermost layer)<(melting point of the innermost layer+10° C.).

If the conditions of (melting point of the innermost layer)<(melting point of the outermost layer) are satisfied, the innermost layer alone is melted upon the thermal fusion bonding between the tab sealant and the tab, without melting the outermost layer.

If the conditions of (melting point of the outermost layer)<(melting point of the innermost layer+10° C.) are not satisfied, it is necessary that the tab and the packaging material be thermally fusion bonded under conditions of a high thermal fusion bonding temperature and a prolonged thermal fusion bonding time.

Further, in the case where the conditions of (melting point of the outermost layer)<(melting point of the innermost layer+10° C.) are not satisfied, a difference in melting point of the tab sealant as a whole becomes large and thus, molding (extrusion molding or inflation molding) cannot be performed.

In view of the foregoing results, it has been found that the relationship between the melting point of the sealant layer of the packaging material and the melting point of the resin film used for the tab sealant is preferably such that the conditions of (melting point of outermost layer)<(melting point of sealant layer of packaging material)<(melting point of outermost layer+15° C.) are satisfied.

If the conditions of (melting point of the outermost layer)<(melting point of the sealant layer of the packaging material) are satisfied, the adhesion between the tab and the packaging material can be obtained irrespective of heat dissipation from the leads (metal leads).

If the conditions of (melting point of the sealant layer of the packaging material)<(melting point of the outermost layer+15° C.) are not satisfied, there is some concern that the tab sealant is melted excessively upon thermal fusion bonding.

Examples 15-17 and Comparative Examples 10-14

Next, in the same fabrication method as in Examples 12-14 and Comparative Examples 6-9, tabs and cell samples for evaluation having such configurations shown in Table 4 were made. The results of evaluations of the shape, adhesion, insulation and filling performance of the tabs and cell samples for evaluation with configurations of Table 4 are shown in Table 5.

It will be noted that in the column of adhesion of the tabs and cell samples for evaluation with configurations shown in Tables 4 and 5, peel strength used as an evaluation reference (reference peel strength) was one obtained from the test results of adhesion in Example 15. In the following Table 5, the symbol "-" at the column of adhesion of Example 15 indicates reference peel strength itself.

TABLE 4

|  | Innermost layer | Outermost layer | Sealant layer | Intermediate layer group |
|---|---|---|---|---|
| Example 15 | A-10 | B-11 | F-4 | C-5 |
| Example 16 | A-9 | B-10 | F-4 | C-6 |
| Example 17 | A-10 | B-11 | F-5 | C-5 |
| Comp. Ex. 10 | A-11 | B-10 | F-4 | C-5 |
| Comp. Ex. 11 | A-11 | B-11 | F-4 | C-5 |
| Comp. Ex. 12 | A-12 | B-11 | F-4 | C-5 |
| Comp. Ex. 13 | A-10 | B-12 | F-4 | C-5 |
| Comp. Ex. 14 | A-11 | B-10 | F-4 | C-4 |

TABLE 5

| | Melting point [° C.] | | | | Heat quantity of fusion [mJ/mg] | | | | | | | |
|---|---|---|---|---|---|---|---|---|---|---|---|---|
| | Innermost layer | Outermost layer | Sealant layer | Intermediate layer group | Innermost layer | Outermost layer | Sealant layer | Intermediate layer group | Shape | Adhesion | Insulation | Packing performance |
| Example 15 | 140 | 143 | 152 | 159 | 26 | 30 | 45 | 62 | ○ | — | ○ | ○ |
| Example 16 | 137 | 140 | 152 | 161 | 19 | 26 | 45 | 75 | Δ | ○ | ○ | ○ |
| Example 17 | 140 | 143 | 161 | 159 | 26 | 30 | 75 | 62 | ○ | ○ | Δ | ○ |

TABLE 5-continued

| | Melting point [° C.] | | | | Heat quantity of fusion [mJ/mg] | | | | Shape | Adhesion | Insulation | Packing performance |
|---|---|---|---|---|---|---|---|---|---|---|---|---|
| | Innermost layer | Outermost layer | Sealant layer | Intermediate layer group | Innermost layer | Outermost layer | Sealant layer | Intermediate layer group | | | | |
| Comp. Ex. 10 | 143 | 140 | 152 | 159 | 30 | 26 | 45 | 62 | X | ○ | ○ | ○ |
| Comp. Ex. 11 | 143 | 143 | 152 | 159 | 30 | 30 | 45 | 62 | X | ○ | ○ | ○ |
| Comp. Ex. 12 | 159 | 143 | 152 | 159 | 62 | 30 | 45 | 62 | X | ○ | ○ | X |
| Comp. Ex. 13 | 140 | 159 | 152 | 159 | 26 | 62 | 45 | 62 | ○ | X | ○ | ○ |
| Comp. Ex. 14 | 143 | 140 | 152 | 137 | 30 | 26 | 45 | 19 | X | ○ | X | ○ |

As shown in Table 5, excellent results are obtained on the evaluation of any of the shape, adhesion, insulation and filling performance in Example 15.

In the shape evaluation of Example 16, since the outermost layer was more likely to be melted than in Example 15, it was inferior to that of Example 15, but with the results of the evaluation being "good".

As to the insulation of Example 16, although the innermost layer and outermost layer were liable to be melted, the intermediate layer was not melted to secure the film thickness of the tab sealant. Thus, excellent results were obtained.

As to the adhesion and filling performance of Example 16, excellent results as in Example 15 were obtained.

With respect to the insulation of Example 17, since the sealant layer of the packaging material was less likely to be melted than the intermediate layer, thermal fusion bonding had to be performed under conditions more than such a thermal fusion bonding temperature and time that the sealant layer of the packaging material was melted, with concern that the intermediate layer was melted. Although inferior to Example 15, the results of evaluation of the insulation of Example 17 were "good".

As to the shape evaluation, adhesion and filling performance of Example 17, excellent results were obtained like Example 15.

As to the shape evaluation of Comparative Example 11, since the melting point and heat quantity of fusion of the outermost layer were, respectively, lower than the melting point and heat quantity of fusion of the innermost layer, the outermost layer was melted earlier than the innermost layer. This, the outermost layer of Comparative Example 10 could not keep its shape.

With respect to the shape evaluation of Comparative Example 11, excellent results could not be obtained for a similar reason as in Comparative Example 10.

Where resins having similar characteristics were used for the innermost layer and outermost layer, respectively, as in Comparative Example 11, the innermost layer and outermost layer were both melted.

As to the shape evaluation of Comparative Example 12, excellent results could not be obtained for a similar reason as in Comparative Example 10.

As to the filling performance of Comparative Example 12, the innermost layer was less likely to be melted in Comparative Example 12, so that the neighborhood of the lead could not be filled with the resin of the tab sealant.

With respect to the adhesion of Comparative Example 13, since the melting point of the outermost layer was high, the tab could not be well bonded to the sealant layer of the packaging material. When the thermal fusion bonding temperature was raised and the thermal fusion bonding time was prolonged, the innermost layer and the intermediate layer were melted excessively, thereby lowering the insulation.

As to the shape evaluation of Comparative Example 14, excellent results could be obtained for a similar reason as in Comparative Example 10.

As to the insulation of Comparative Example 14, the intermediate layer was more likely to be melted than the innermost and outer most layers, so that the film thickness of the tab sealant could not be secured, thus lowering the insulation.

From the above results, it was found that the conditions of (melting point of the innermost layer)<(melting point of the outermost layer)<(melting point of the innermost layer+10° C.) should preferably be satisfied.

If the conditions of (melting point of the innermost layer)<(melting point of the outermost layer) are satisfied, the innermost layer alone was melted and the outermost layer is not melted upon thermal fusion bonding.

If the conditions of (melting point of the outermost layer)<(melting point of the innermost layer+10° C.) are not satisfied, thermal fusion bonding between the tab and the packaging material is needed to be performed under conditions of a high thermal fusion bonding temperature and prolonged thermal fusion bonding time.

Moreover, if the conditions of (melting point of the outermost layer)<(melting point of the innermost layer+10° C.) are not satisfied, a difference in melting point of the tab sealant as a whole becomes so large that molding (extrusion molding or inflation molding) cannot be performed.

Further, the above results revealed that the resin film used for the tab sealant should preferably satisfy the conditions of (melting point of the outermost layer+15° C.)<(melting point of the intermediate layer)<(melting point of the outermost layer+25° C.).

If the conditions of (melting point of the outermost layer+15° C.)<(melting point of the intermediate layer) are not satisfied, there is some concern that the intermediate layer is melted upon thermal fusion bonding and thus, insulation cannot be secured.

If the conditions of (melting point of the intermediate layer)<(melting point of the outermost layer+25° C.) are not satisfied, a difference in melting point of the tab sealant as a whole becomes so large that molding (extrusion molding or inflation molding) cannot be performed.

Additionally, the above results revealed that in the relationship between the melting point of the sealant layer of the packaging material and the melting point of the resin film used for the tab sealant, the conditions of (melting point of the outermost layer)<(melting point of the sealant layer of the packaging material) should preferably be satisfied.

If the conditions of (melting point of the outermost layer)<(melting point of the sealant layer of the packaging material) are satisfied, the adhesion between the tab and the packaging material can be secured regardless of heat dissipation from the lead (metal lead).

If the conditions of (melting point of the sealant layer of the packaging material)<(melting point of the outermost layer+15° C.) are not satisfied, there is concern that the tab sealant is melted excessively upon thermal fusion bonding.

Further, the above results revealed that in the relationship between the melting point of the packaging material and the melting point of the resin film used for the tab sealant, the conditions of (melting point of the sealant layer of the packaging material+5° C.)<(melting point of the intermediate layer)<(melting point of the sealant layer of the packaging material+20° C.) should preferably be satisfied, If the conditions of (melting point of the sealant layer of the packaging material+5° C.)<(melting point of the intermediate layer) are satisfied, the intermediate layer is not melted upon the thermal fusion bonding between the tab and the packaging material, thereby securing insulation.

If the conditions of (melting point of the intermediate layer)<(melting point of the sealant layer of the packaging material+20° C.) are not satisfied, a difference in melting point of the tab sealant as a whole becomes so large that molding (extrusion molding or inflation molding) cannot be performed.

As will be seen from the foregoing, the resin films of the respective examples exhibit good adhesion to the lead and packaging material along with good filling performance at a lead terminal end portion and insulation.

REFERENCE SIGNS LIST 1, 2 metal terminal member (tab) 3 packaging material 11, 21 resin film for coverage of a metal terminal for secondary cell (tab sealant) 12 lead 13 corrosion inhibition treatment layer 14 innermost layer 15 outermost layer 16 intermediate layer group 31 base material layer 32 adhesive layer 33 metal foil layer 34 corrosion inhibition treatment layer for packaging material 35 adhesive resin layer 36 sealant layer

What is claimed is:

1. A packaging material for a secondary cell, comprising:
a sealant layer formed of a polyolefin resin; and
a resin film comprising:
two leads connected to a positive electrode and a negative electrode inside the cell, respectively, with the resin film being disposed between the sealant layer and the leads; and,
a first layer disposed at a position close to each of the leads and a second layer disposed at a position close to the sealant layer, wherein a heat quantity of fusion of the second layer, measured according to JIS K 7122, is larger than a heat quantity of fusion of the first layer, measured according to JIS K 7122 and wherein at least one of the following conditions is satisfied:
a) the heat quantity of fusion of the first layer, measured according to JIS K 7122, is from not less than 15 mJ/mg to not larger than 65 mJ/mg and
b) the heat quantity of fusion of the second layer, measured according to JIS K 7122, is from not less than 25 mJ/mg to not larger than 80 mJ/mg.

2. The packaging material of claim 1, wherein the heat quantity of fusion of the second layer, measured according to JIS K 7122, is less than a heat quantity of fusion of the sealant layer, measured according to JIS K 7122.

3. The packaging material of claim 1, wherein the melting point of the first layer and the melting point of the second layer satisfy the conditions of (melting point of the first layer)<(melting point of the second layer)<(melting point of the first layer +10° C.).

4. The packaging material of claim 1, wherein the melting point of the sealant layer of the packaging material and the melting point of the second layer can satisfy the conditions of (melting point of the sealant layer of the packaging material +5° C.)<melting point of the second layer)<(melting point of the sealant layer of the packaging material +20° C.).

5. The packaging material of claim 1, wherein the melting point of the sealant layer of the packaging material and the melting point of the second layer satisfy the conditioned of (melting point of the second layer)<(melting point of the sealant layer of the packaging material)<(melting point of the second layer +15° C.).

6. A packaging material for a secondary cell, comprising:
a sealant layer formed of a polyolefin resin; and
a resin film comprising:
two leads connected to a positive electrode and a negative electrode inside the cell, respectively, with the resin film being disposed between the sealant layer and the leads; and,
a first layer disposed at a position close to each of the leads and a second layer disposed at a position close to the sealant layer, and an intermediate layer disposed between the first and second layers, wherein a heat quantity of fusion of the second layer, measured according to JIS K 7122, is not less than a heat quantity of fusion of the first layer, measured according to JIS K 7122, wherein a heat quantity of the intermediate layer, measured according to JIS K 7122, is not less than the heat quantity of fusion of the second layer, measured according to JIS K 7122 and wherein at least one of the following conditions is satisfied:
a) the intermediate layer has at least one layer whose heat quantity of fusion, measured according to JIS K 7122, is not less than 45 mJ/mg and
b) the intermediate layer is made of a laminate having a plurality of sub-layers wherein a heat quantity of fusion, measured according to JIS K 7122, of a sub-layer whose heat quantity of fusion is the smallest among those of the plurality of sub-layers of the intermediate layer is larger than the heat quantity of fusion of the sealant layer, measured according to JIS K 7122.

7. The packaging material of claim 6, wherein the melting point of the intermediate layer and the melting point of the second layer satisfy the conditions of (melting point of the second layer +15° C.)<(melting point of the intermediate layer)<(melting point of the second layer +25° C.).

8. A metal terminal member for a secondary cell comprising the packaging material of claim 1.

9. A secondary cell comprising the packaging material of claim 1.

* * * * *